United States Patent
Otani

(10) Patent No.: US 8,990,374 B2
(45) Date of Patent: Mar. 24, 2015

(54) METHOD AND APPARATUS OF CLOUD COMPUTING SUBSYSTEM

(75) Inventor: Toshio Otani, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 94 days.

(21) Appl. No.: 13/552,482

(22) Filed: Jul. 18, 2012

(65) Prior Publication Data

US 2014/0025816 A1     Jan. 23, 2014

(51) Int. Cl.
*G06F 15/173*     (2006.01)
*G06F 9/50*     (2006.01)

(52) U.S. Cl.
CPC .................... *G06F 9/5072* (2013.01)
USPC ........................................ 709/223

(58) Field of Classification Search
CPC .. H04I 29/06; H04I 29/08072; H04I 29/0809; H04I 29/08144; H04L 63/08
USPC ........................ 709/225, 205, 206, 207, 223
See application file for complete search history.

(56) References Cited

U.S. PATENT DOCUMENTS

| | | | | |
|---|---|---|---|---|
| 8,560,663 | B2* | 10/2013 | Baucke et al. | 709/223 |
| 8,831,000 | B2* | 9/2014 | Mishra et al. | 370/390 |
| 8,832,820 | B2* | 9/2014 | Barjatiya et al. | 726/13 |
| 2011/0299537 | A1* | 12/2011 | Saraiya et al. | 370/392 |

OTHER PUBLICATIONS

OpenBlock Project; downloaded from http://openblockproject.org on Jun. 7, 2012.
VMware vCloud Director; downloaded from http://www.nmware.com/products/vcloud-director/overview.html on Jun. 7, 2012.
Vblock Converged Infrastructure Platforms, Turnkey Private Clound Solutions; downloaded from http://www.vce.com/vblock/ on Jun. 7, 2012.

* cited by examiner

*Primary Examiner* — Kevin Bates
*Assistant Examiner* — Clarence D McCray
(74) *Attorney, Agent, or Firm* — Procopio, Cory, Hargreaves & Savitch LLP

(57) ABSTRACT

Example embodiments described herein are directed to providing cloud computing subsystems for computing resource provisioning with various service levels on specific network isolated areas. Example embodiments described herein may also provide protocols for controlling the flow of a frame from and to each tenant in a cloud computing subsystem.

18 Claims, 28 Drawing Sheets

Create New Machine

Machine Name: MyMachine01

Number of virtual processors: 4

Memory Size: 256 GB

Tenant: Tenant-A

Next   Back

FIG. 10(c)

Create New Machine

MyMachine01 in Tenant-A

Number of NICs: 2

NIC 1: DMZ

NIC 2: Private

[ Next ] [ Back ]

FIG. 10(d)

Create New Machine

MyMachine01 in Tenant-A

Number of Disks: [ 1 ▽ ]

Disk 1:  ○ Virtual Volume
         ● Physical Volume

Disk Size: [ 1024 ] [ GB ▽ ]

Pool: [ MyPool1 ▽ ]

[ Finish ] [ Back ]

FIG. 10(e)

Create New Machine

MyMachine01 in Tenant-A

Number of Disks: | 1 ▽ |

Disk 1: ● Virtual Volume
○ Physical Volume

Disk Size: | 1024 | GB ▽ |
Pool: | MyPool1 ▽ |

[Finish] [Back]

FIG. 10(f)

Create New Machine

MyMachine01 in Tenant-A

Number of Disks: 1

Disk 1:  ● Virtual Volume
         ○ Physical Volume

Disk Size: 1024 GB

Pool: MyPool1

Datastore: LUN01

[Finish] [Back]

FIG. 10(g)

| Host ID | CPU | Memory | NIC | Disk | Status |
|---|---|---|---|---|---|
| Host100-1 | 2 | 128 GB | MP01 | 500GB x 2 | Deployed (ESXi) |
| Host100-2 | 2 | 128 GB | MP02 | 500GB x 2 | Deployed (ESXi) |
| Host100-3 | 2 | 128 GB | MP03 | 500GB x 2 | Deployed (Bare-metal) |
| Host100-4 | 2 | 128 GB | MP04 | 500GB x 2 | Deployed (SMP) |
| Host100-5 | 4 | 256 GB | MP05 | 500GB x 2 | Deployed (SMP) |
| Host100-6 | 4 | 256 GB | MP06 | 500GB x 2 | Deployed (ESXi) |
| Host100-7 | 4 | 256 GB | MP07-1, MP07-2 | 500GB x 2 | Unused |
| Host100-8 | 4 | 256 GB | MP08-1, MP08-2 | 500GB x 2 | Reserved |

FIG. 11

| Storage ID | Pool | LUN | Status |
|---|---|---|---|
| Storage300-1 | MyPool1 | 00 | Used (ESXi) |
| Storage300-1 | MyPool1 | 01 | Used (ESXi) |
| Storage300-1 | MyPool1 | 02 | Used (RDM) |
| Storage300-1 | MyPool1 | 03 | Empty |
| Storage300-1 | MyPool1 | 04 | Reserved |
| Storage300-1 | MyPool1 | 05 | Empty |
| Storage300-1 | MyPool1 | 06 | Empty |

FIG. 12

| Tenant ID | Member | VLAN ID |
|---|---|---|
| A | MV01, MV02, MV03, MV04, MP04, LU02 | 100 |
| B | MV11, MV12, MV13 | 200 |

FIG. 13

| MAC Address | IP Address | Image |
|---|---|---|
| MX01 | 10.1.1.1 | |
| MX02 | 10.1.1.2 | |
| MX03 | 10.1.1.3 | |
| MX04 | 10.1.1.4 | |
| MP04 | 10.1.1.5 | |
| LU02 | 10.1.1.6 | |
| MX11 | 10.1.1.1 | |
| MX12 | 10.1.1.2 | |
| MX13 | 10.1.1.3 | |
| MP01 | 192.168.1.1 | tftp://1.1.1.1/myESXi |
| MP02 | 192.168.1.2 | tftp://1.1.1.1/myESXi |
| MP06 | 192.168.1.6 | tftp://1.1.1.1/myESXi |

FIG. 14

| # | SW Port | MAC Src | MAC Dst | Eth Type | VLAN ID | IP Src | IP Dst | IP Prot | TCP Sport | TCP Dport | Action |
|---|---|---|---|---|---|---|---|---|---|---|---|
| 1 | * | * | (bcast) | ARP | * | * | * | * | * | * | CONTROLLER |
| 2 | * | MV01, MV02, MV03, MV04, MP04, LU02 | MV01, MV02, MV03, MV04, MP04, LU02 | * | * | * | * | * | * | * | NORMAL |
| 3 | * | MV11, MV12, MV13 | MV11, MV12, MV13 | * | * | * | * | * | * | * | NORMAL |

FIG. 17

| # | SW Port | MAC Src | MAC Dst | Eth Type | VLAN ID | IP Src | IP Dst | IP Prot | TCP Sport | TCP Dport | Action |
|---|---|---|---|---|---|---|---|---|---|---|---|
| 1 | P24 | * | * | * | 100 | * | * | * | * | * | Remove Ether/IP Header |
| 2 | * | * | (bcast) | ARP | * | * | * | * | * | * | CONT ROLLER |
| 3 | * | MV01, MV02, MV03, MV04, MP04, LU02 | * | * | * | * | * | * | * | * | Group Tenant-A |
| 4 | * | MV11, MV12, MV13 | * | * | * | * | * | * | * | * | Group Tenant-B |

FIG. 18(a)

(Group Tenant-A)

| # | SW Port | MAC Src | MAC Dst | Eth Type | VLAN ID | IP Src | IP Dst | IP Prot | TCP Sport | TCP Dport | Action |
|---|---|---|---|---|---|---|---|---|---|---|---|
| 11 | * | * | (bcast) | * | * | * | * | * | * | * | P0, P1, P2, P3 |
| 12 | * | * | (bcast) | * | * | * | * | * | * | * | Add VLAN ID 100, P24 |
| 13 | * | * | MV01, MV02 | * | * | * | * | * | * | * | P0 |
| 14 | * | * | MV03 | * | * | * | * | * | * | * | P1 |
| 15 | * | * | MP04 | * | * | * | * | * | * | * | P2 |
| 16 | * | * | LU02 | * | * | * | * | * | * | * | P3 |
| 17 | * | * | MV04, MV13 | * | * | * | * | * | * | * | Add Ether/IP Header, then P24 |

FIG. 18(b)

(Group Tenant-A)

| # | SW Port | MAC Src | MAC Dst | Eth Type | VLAN ID | IP Src | IP Dst | IP Prot | TCP Sport | TCP Dport | Action |
|---|---|---|---|---|---|---|---|---|---|---|---|
| 21 | * | * | (bcast) | * | * | * | * | * | * | * | P0, P1, P2, P512 |
| 22 | * | * | MV01 | * | * | * | * | * | * | * | P0 |
| 23 | * | * | MV02 | * | * | * | * | * | * | * | P1 |
| 24 | * | * | MV03, MV04, MP04, LU02 | * | * | * | * | * | * | * | P512 |

FIG. 18(c)

| Switch ID | Node | Port ID |
|---|---|---|
| PSwitch01 | VSwitch01 | P0 |
| PSwitch01 | VSwitch02 | P1 |
| PSwitch01 | MP04 | P2 |
| PSwitch01 | LU02 | P3 |
| PSwitch01 | Uplink | P24 |
| VSwitch01 | MV01 | P0 |
| VSwitch01 | MV02 | P1 |
| VSwitch01 | MV11 | P2 |
| VSwitch01 | Uplink | P512 |
| VSwitch02 | MV03 | P0 |
| VSwitch02 | MV12 | P1 |
| VSwitch02 | Uplink | P512 |

FIG. 19(a)

| Switch ID | Node | Port ID |
|---|---|---|
| PSwitch02 | VSwitch03 | P0 |
| PSwitch02 | Uplink | P24 |
| VSwitch03 | MV04 | P0 |
| VSwitch03 | MV13 | P1 |
| VSwitch03 | Uplink | P512 |

FIG. 19(b)

METHOD AND APPARATUS OF CLOUD COMPUTING SUBSYSTEM

BACKGROUND

1. Field

Example embodiments are generally related to information technology (IT) platform subsystems providing computing resources through a service console, and more specifically, to computing resource provisioning with various service levels in a specific network isolated area.

2. Related Art

Various types of cloud computing have been produced in the related art for Infrastructure as a Service (IaaS) type cloud enablement subsystems. IaaS provides computing resource images to an end user, so that end user could procure a computing resource via cloud hosting service, instead of purchasing physical equipment to create a computing resource. The end user could use the computing resource in IaaS immediately and install desired operating systems and application software. The computing resource can be made of physical resources (e.g., physical machines, bare metal servers, etc.) and virtual resources (e.g., virtual machines, etc.)

There are various solutions in the related art to enable cloud computing. These current solutions provide virtualized computing resource images to the end user via a service console. Service consoles may involve a host resource, network gear, a storage array, hypervisor software, kernel based virtual resources (KVM), and management software.

SUMMARY

Aspects of the embodiments may include a computer system, involving a host computer; a management computer managing a plurality of tenants, wherein at least one of the plurality of tenants comprises at least one of one or more virtual resources and one or more physical resources on the host computer; and one or more switches controlling an access of each of the plurality of tenants by using address information of the at least one of the one or more virtual resources and the one or more physical resources based on flow information from the management computer.

Aspects of the embodiments may include a management computer, that includes a central processing unit (CPU) that is configured to manage a plurality of tenants, wherein at least one of the plurality of tenants comprises at least one of one or more virtual resources and one or more physical resources on the host computer; and manage flow information for each of the plurality of tenants; the flow information associated with address information of the at least one of the one or more virtual resources and the one or more physical resources for use by one or more switches for controlling an access of each of the plurality of tenants.

Aspects of the embodiments may include a computer readable storage medium storing instructions for a management computer, which may involve instructions for managing a plurality of tenants, wherein at least one of the plurality of tenants comprises at least one of one or more virtual resources and one or more physical resources on the host computer; and managing flow information for each of the plurality of tenants; the flow information associated with address information of the at least one of the one or more virtual resources and the one or more physical resources for use by one or more switches for controlling an access of each of the plurality of tenants.

BRIEF DESCRIPTION OF THE DRAWINGS

FIG. 11 illustrates a host management table, in accordance with an example embodiment.

FIG. 12 illustrates a storage management table, in accordance with an example embodiment FIG. 13 illustrates a tenant management table, in accordance with an example embodiment.

FIG. 14 illustrates an example of an address management table, in accordance with an example embodiment.

FIG. 17 illustrates an example of a flow table for Open-Flow, in accordance with an example embodiment.

FIGS. 18(*a*) to 18(*c*) illustrate various examples of flow tables for OpenFlow, in accordance with an example embodiment.

FIGS. 19(*a*) and 19(*b*) illustrate examples of switch management table, in accordance with an example embodiment.

DETAILED DESCRIPTION

Figure 1:
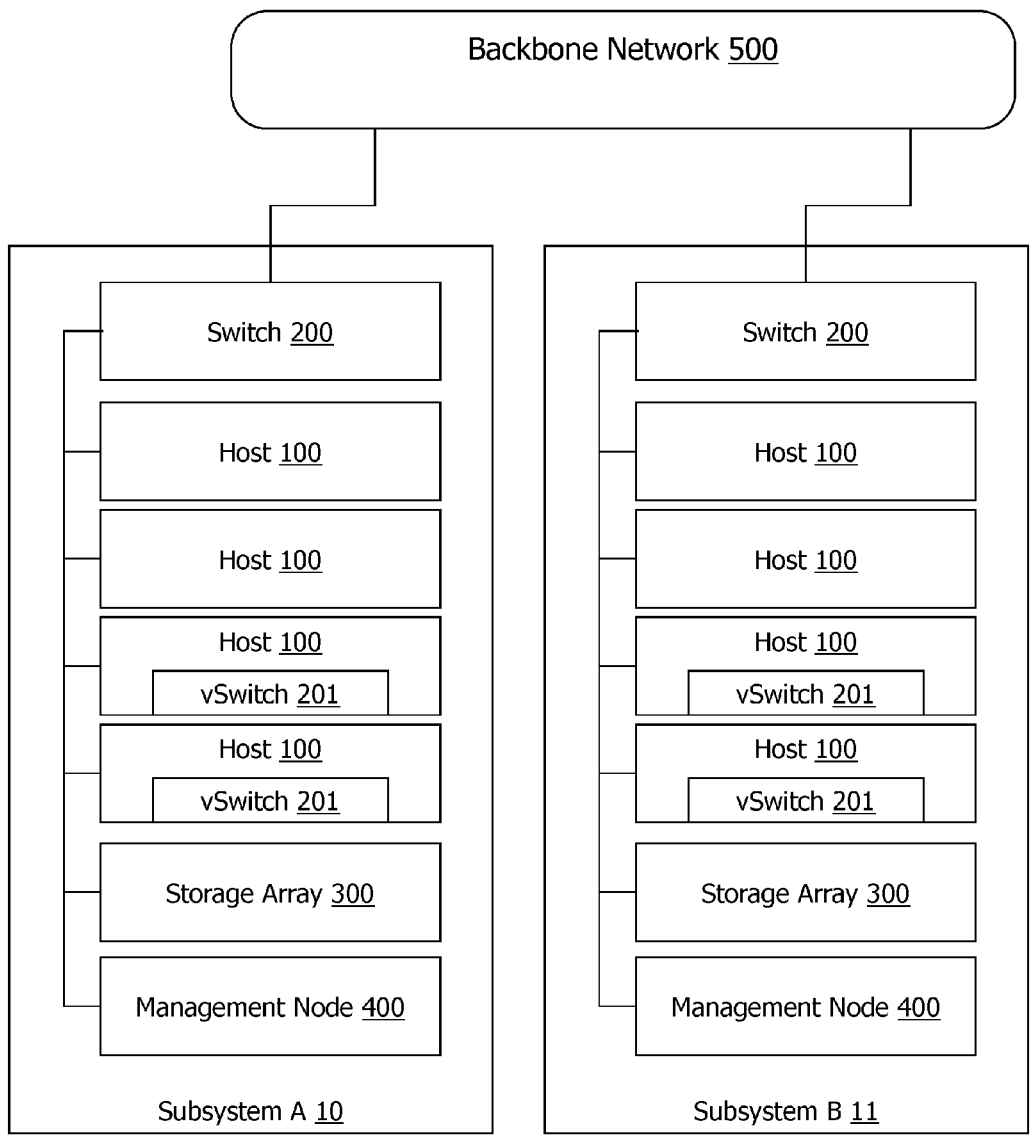
FIG. 1 illustrates a system configuration in accordance with an example embodiment.

In the following detailed description of example embodiments, reference will be made to the accompanying drawings, in which identical functional elements are designated with like numerals. The aforementioned accompanying drawings show by way of illustration, and not by way of limitation, example embodiments and implementations. These implementations are described in sufficient detail to enable those skilled in the art, and it is to be understood that other implementations may be utilized and that structural changes and/or substitutions of various elements may be made without departing from the scope and spirit of the example embodiments. The following detailed description is, therefore, not to be construed in a limited sense.

Several problems may occur with the solutions in the related art. One problem is that there may be less service level variety of provided computing resources. The related art provides virtualized computing resource images through hypervisor software running on host resources. Virtual resources are used for specific applications such as a web front end, but in data centers there are other service level requirements for back end computing resources such as databases.

Another problem is providing for network isolated tenant management features across data centers and subsystems. In order to create network isolated tenant across the subsystems, a backbone network which connects each subsystem needs to be re-configured for settings such as a virtual local area network identifier (VLAN ID). Some related art solutions provides automated re-configuration methods, but such methods may not meet the network operation policy of the backbone network.

In one example embodiment, the cloud computing subsystem includes one or more host resources, storage arrays, network switches, and management nodes. Network switches of the cloud computing subsystem connect to a backbone network managed separately from the cloud computing subsystem. The management node may also deploy a host resource as either a physical computing resource or a virtual computing resource on hypervisor software, by using a host management table with host ID and host status information of each host. The management node may also configure network isolated domains that host one or more host resources, storage arrays, and/or virtual resources that can be identified by VLAN ID and/or network addresses such as media access controller (MAC) address, by using a tenant management table with tenant ID and tenant member information. The cloud computing subsystem may provide a computing resource image through a service console that allows the tenant user to define the service level of the computing resource image, and also allows the tenant user to define the network domain. Each computing resource image may include central processing units (CPU), memory, I/O device, and external storage volumes.

In another example embodiment, a first cloud computing subsystem includes a host resource, a storage array, a network switch, and a management node. A second cloud computing subsystem includes a host resource, a storage array, a network switch, and a management node. Network switches of the first and the second cloud computing subsystem connect to a backbone network managed separately from the first and second cloud computing subsystem. The management node may deploy a host resource as either a physical computing resource or a virtual computing resource on hypervisor software, by using a host management table with host ID and host status information of each host. The management node may also configure network isolated domains that host one or more host resources, storage arrays, and/or virtual resources that can be identified by VLAN ID and/or network addresses such as MAC address, by using a tenant management table with tenant ID and tenant member information. The network isolated domain may be created via the first and/or second cloud computing subsystem, and may be created without a backbone network configuration. The cloud computing subsystem may provide a computing resource image through service console that allows the tenant user to define the service level of the computing resource image, and also allows the tenant user to define the network domain. Each computing resource image may include central processing units (CPU), memory, I/O device, and external storage volumes. Features implemented or executed by the CPU may be stored in a computer readable storage medium involving tangible devices, such as RAM, flash memory, hard disk drive and so on. The features may also be stored in a computer readable signal medium, which includes transitory media such as carrier waves.

FIG. 1 illustrates a system configuration in accordance with an example embodiment. The system has one or more cloud computing subsystems. In the example of FIG. 1, there are two cloud computing subsystems 10 and 11. Each cloud computing subsystem includes one more hosts 100, a network switch 200, a storage array 300, and a management node 400. Network switch 200 connects to a backbone network 500 which connects the cloud computing subsystem to other systems such as external internet, databases and so on. The backbone network 500 also connects multiple cloud computing subsystems 10 and 11 together, as shown in the example of FIG. 1. One or more hosts 100 may also be connected to a virtual switch 201.

Figure 2:
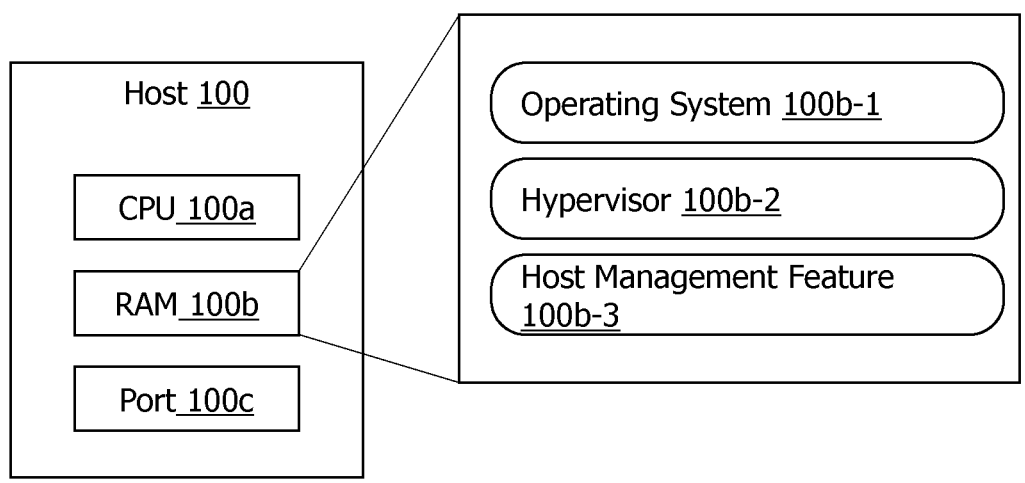
FIG. 2 illustrates a configuration of a host, in accordance with an example embodiment.

FIG. 2 illustrates a configuration of a host, in accordance with an example embodiment. The host may include a central processing unit (CPU) 100a, a random access memory (RAM) 100b, and one or more ports (i.e., 10 gigabit Ethernet) 100c that are connected via an internal bus such as peripheral controller interface (PCI) express. Host 100 may also include software such as an operating system 100b-1, a hypervisor 100b-2 to run virtual resource, and a host management feature 100b-3 for cloud computing operation. The host may be deployed as an x86 computing node.

Figure 3:
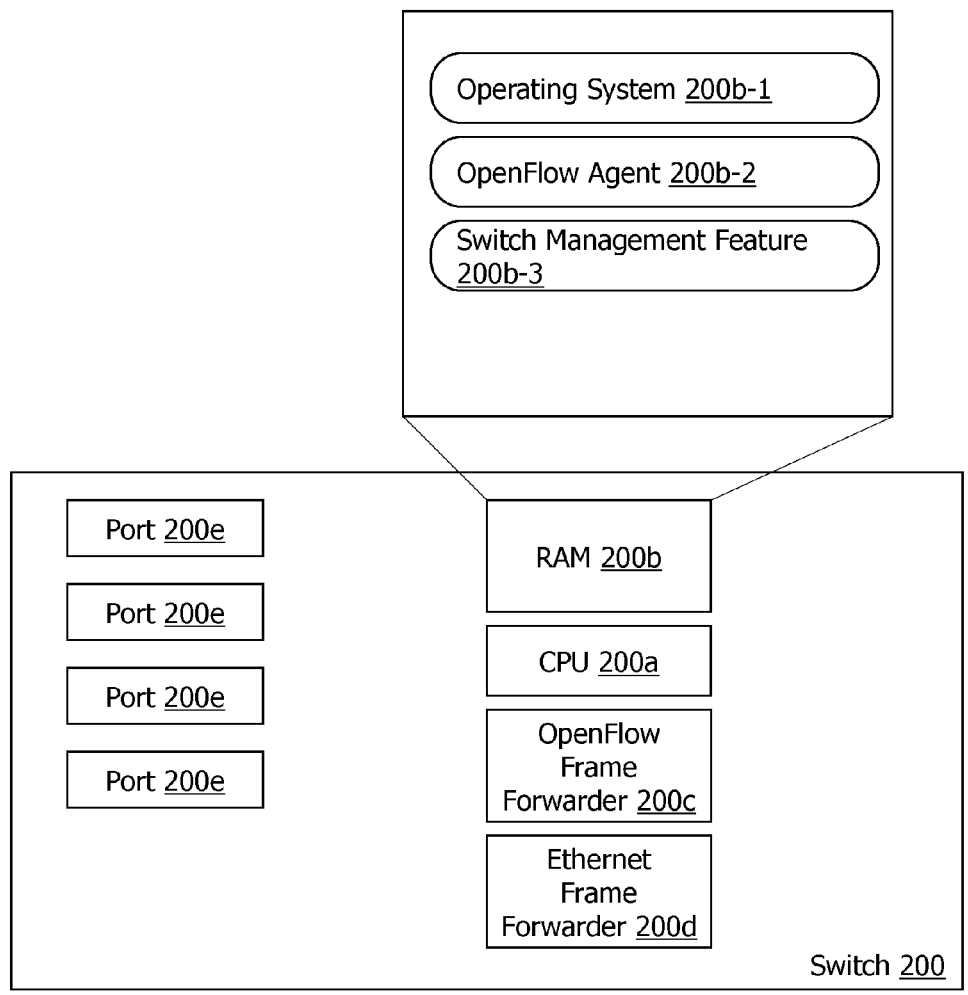
FIG. 3 illustrates a configuration of a switch, in accordance with an example embodiment.

FIG. 3 illustrates a configuration of a switch, in accordance with an example embodiment. Switch 200 may include CPU 200a, RAM 200b, one or more ports 200e (i.e., 10 gigabit Ethernet), OpenFlow Frame Forwarder 200c, and Ethernet Frame Forwarder 200d that are connected via an internal bus such as PCI express. The switch also has software such as an operating system 200b-1, an OpenFlow agent 200b-2 to apply a flow table from an OpenFlow controller on a management node 400 and a switch management feature 200b-3.

Figure 4:
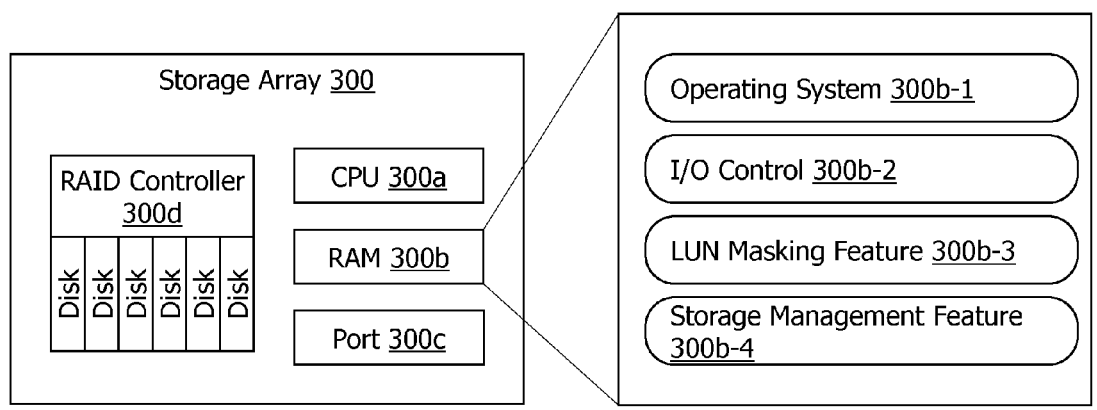
FIG. 4 illustrates a configuration of a storage array, in accordance with an example embodiment.

FIG. 4 illustrates a configuration of a storage array, in accordance with an example embodiment. The storage array 300 may include one or more central processing units (CPU) 300a, random access memory (RAM) 300b, one or more ports 300c (i.e., 10 gigabit Ethernet), and a Redundant Array of Independent Disks (RAID) controller 300d that are connected via an internal bus such as PCI express. The RAID controller 300d consolidates one or more disks such as hard disk drive (HDD) and/or solid state drive (SSD) to provide one or more storage volumes configured as a logical unit (LU) for the host 100. The storage array 300 also has software such as an operating system 300b-1, I/O control 300b-2 to handle storage I/O protocol such as small computer systems interface (SCSI), internet SCSI (iSCSI), network file system (NFS), common internet file system (CIFS), Fibre Channel, Fibre Channel over Ethernet (FCoE), and so on. The storage array 300 may also have a logical unit number (LUN) masking feature 300b-3 to filter logical unit for exposure, and storage management feature 300b-4.

Figure 5:
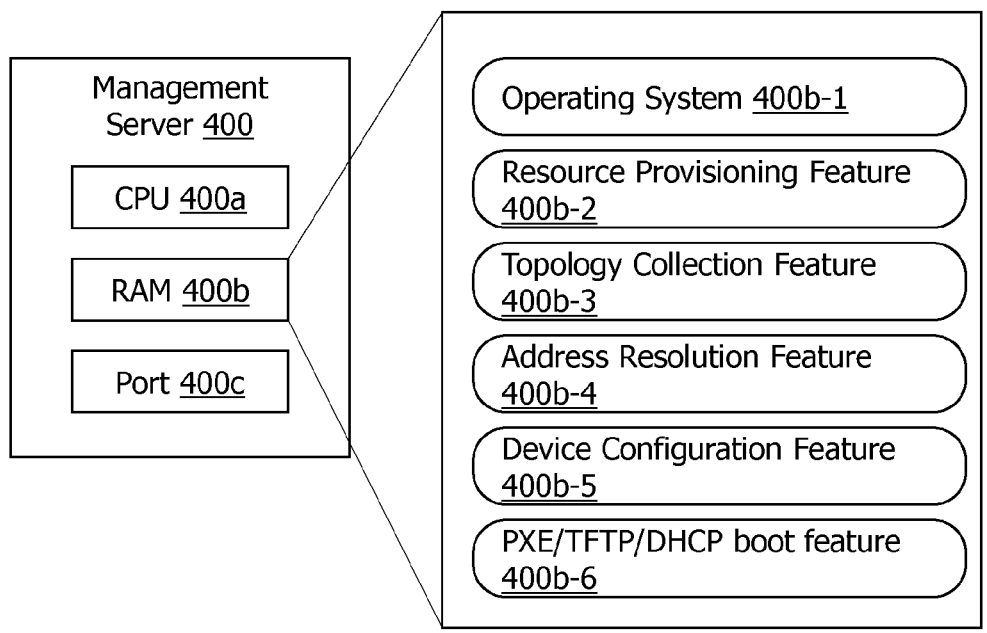
FIG. 5 illustrates a configuration for a management node, in accordance with an example embodiment.

FIG. 5 illustrates a configuration for a management node, in accordance with an example embodiment. The management node 400 may include a CPU 400a, RAM 400b, and one or more ports 400c (i.e., 10 gigabit Ethernet) that are connected via an internal bus such as PCI express. Each component (host 100, switch 200, storage array 300) can be reached from management port 400c. The management node 400 may also have software such as operating system 400b-1, and several software feature sets and management information to operate a cloud computing environment.

The resource provisioning feature 400b-2 allows a tenant user to create a tenant and manage tenant information for tenant management table. The resource provisioning feature contains functions to deploy a host as a physical resource or a virtual resource for a tenant user.

The topology collection feature 400b-3 obtains the configuration of host 100, switch 200, storage array 300, hypervisor software on host 100 for configuring host management table, switch management table, and storage management table.

The address resolution feature 400b-4 conducts address resolution between MAC address and internet protocol (IP) address. The address resolution information is managed in Address management table.

The device configuration feature 400b-5 configures the host 100, network switch 200, storage array 300, and hypervisor software on host 100.

The preboot execution environment (PXE)/trivial file transfer protocol (TFTP)/dynamic host configuration protocol (DHCP) boot feature 400b-6 allows the host 100 to boot via a network as a physical resource (bare-metal or hypervisor enabled resource). The address management table also manages the applied resource image for each resource.

Figure 6:
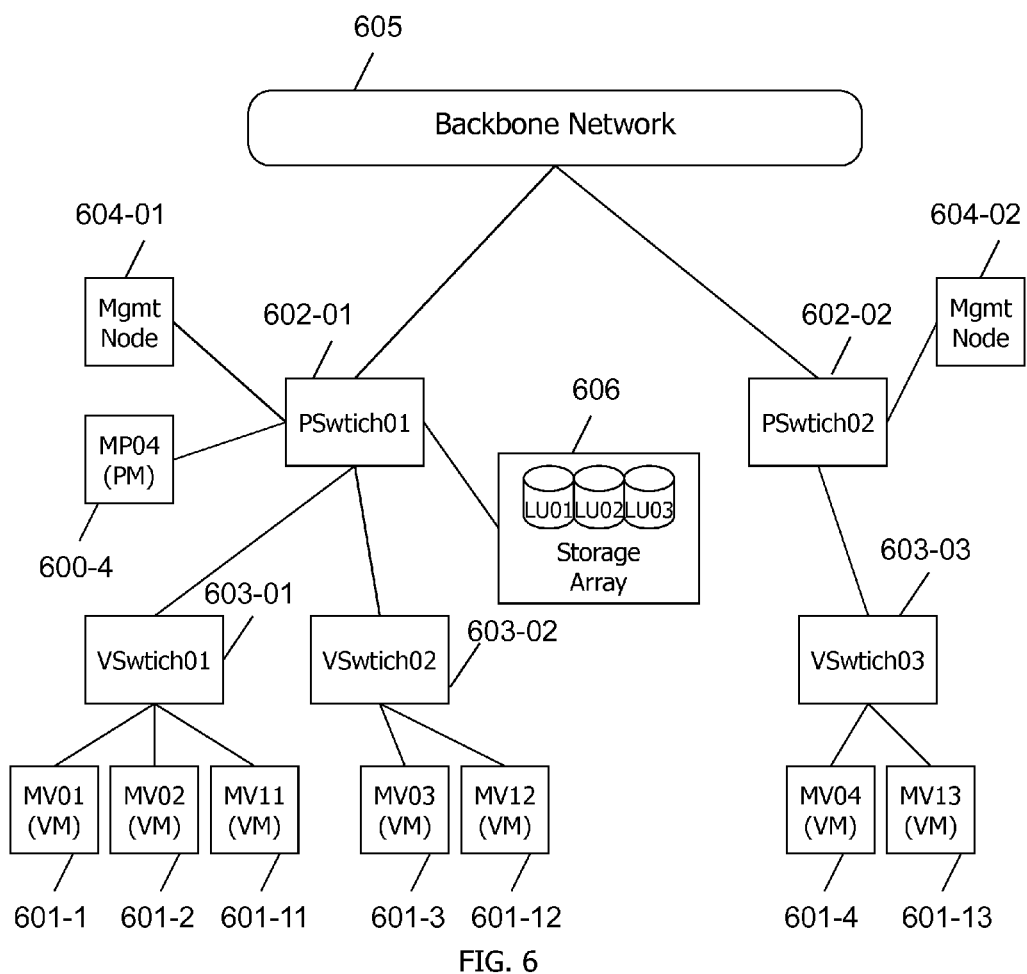
FIG. 6 illustrates a computing resource configuration in accordance with an example embodiment.

FIG. 6 illustrates a computing resource configuration in accordance with an example embodiment. The cloud computing subsystem may provide physical and virtual computing resources for a tenant user. The virtual resources may be deployed on hypervisor software running in physical host 100, as shown at 601-1, 601-2, 601-11, 601-3, 601-12, 601-4, and 601-13. Physical resources may be deployed on physical host 100 as a bare metal server, as shown at 600-4. These physical and virtual computing resources are cloud computing resources which can be used by the tenant user. The tenant user can install guest operation systems, application program, and so forth, on these computing resources.

The cloud computing subsystem also provides network features. The network features can involve physical network switches, as shown at 602-01 and 602-02, and virtual network switches on hypervisor software, as shown at 603-01, 603-02 and 603-03. The physical switches may be managed by management nodes, as shown at 604-01 and 604-02. The physical network switches and virtual network switches connect the physical and virtual resources and utilize network filtering features to create isolated network domains called tenants. Tenants can be defined within same cloud computing subsystem and different cloud computing subsystems through backbone network 605.

The cloud computing subsystem can also provide storage features. For example, a storage array 606 with one or more logical unit (storage volumes) can be provided, which can then be allocated to the physical and virtual resources (e.g., physical machines, virtual machines, etc.) via the physical and virtual switches.

Figure 7:
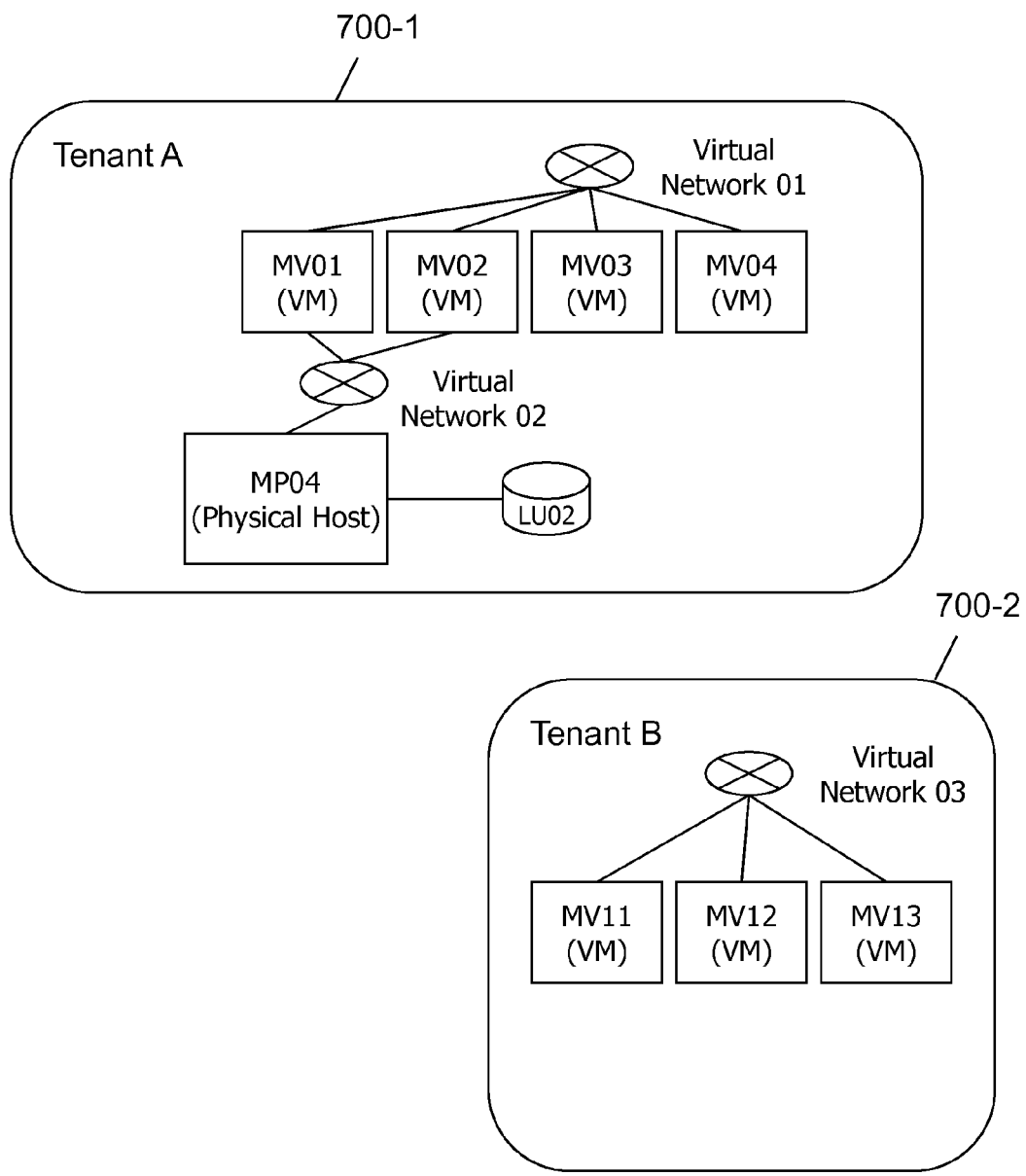
FIG. 7 shows the example tenant configuration, in accordance with a example embodiment.

FIG. 7 shows the example tenant configuration, in accordance with an example embodiment. Each tenant 700-1, 700-2 is a virtually isolated network domain which will be executed by network identifier based filtering technology, such as VLAN ID, network address (like MAC address) of MP*/MV*, logical volume on storage array. The network identifier base filtering can be VLAN isolation, MAC address based filtering, OpenFlow flow table, or other filtering known to a person of ordinary skill in the art. In the example of FIG. 7, there is a virtual network within tenant, (e.g., virtual network 01 in Tenant-A 700-1). The cloud computing subsystem may permit the user to create a virtual network in a tenant by using OpenFlow flow control which restricts communication among different VLAN. Ethernet frames with a VLAN ID can be regarded as belonging to a particular virtual network within a tenant, (e.g., shown as virtual network 01 and 02 in tenant A 700-1). Further detail is provided in the description of FIG. 17 below.

Figure 8:
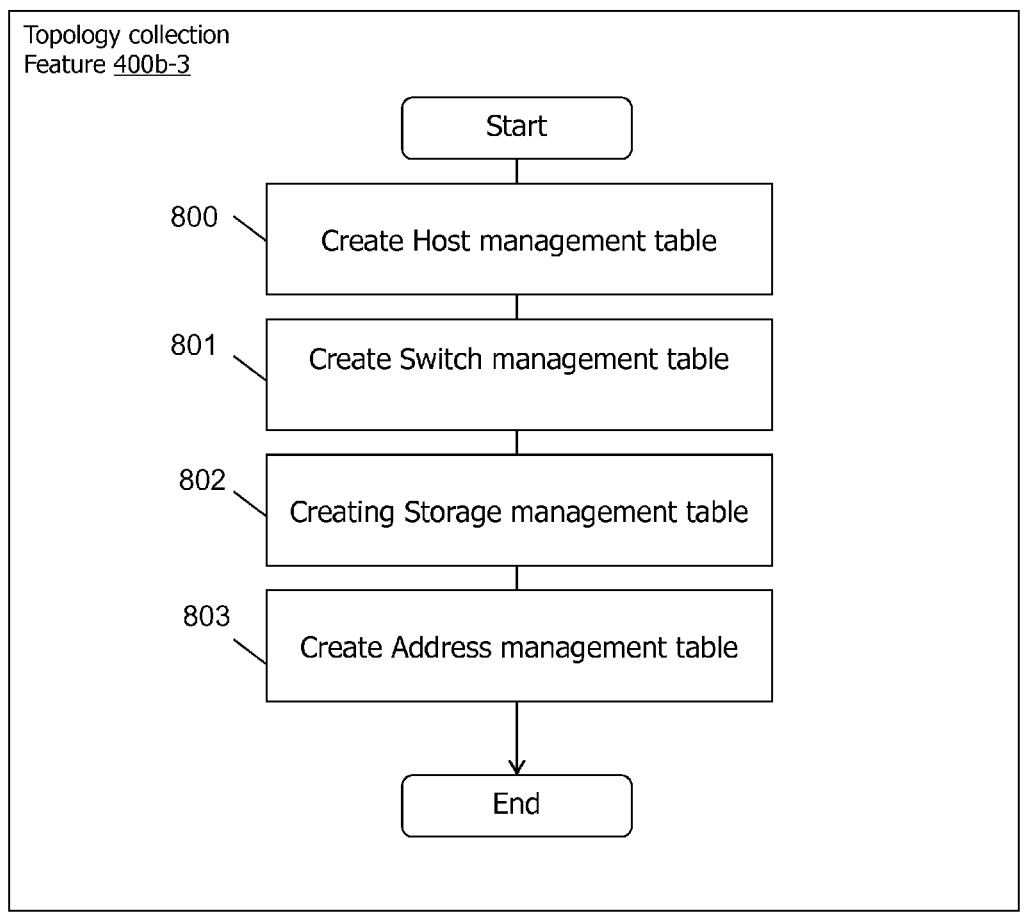
FIG. 8 illustrates a flowchart for the cloud computing subsystem, in accordance with an example embodiment.

FIG. 8 illustrates a flowchart for the cloud computing subsystem, in accordance with an example embodiment. The cloud computing subsystem will be shipped to data center with a fixed hardware configuration (e.g., 24 physical hosts, 2 physical switches, 1 storage array, and 2 management nodes). Each component is pre-wired to physical switches. Software configuration of management nodes is also pre-configured, as described before. In this process, management node 400 creates several management tables as below.

At 800, the topology collection feature 400b-3 creates a host management table, by obtaining host information (e.g., CPU, memory, number of I/O, number of disks etc.) from each host, through a protocol (e.g., Intelligent Platform Management Interface (IPMI), Baseboard Management Controller (BMC), customized proprietary protocols, etc.)

At 801, the topology collection feature 400b-3 creates a switch management table, by obtaining topology mapping/connection information between the switch 200 and the host 100/storage array 300. The topology mapping/connection information can be setup manually before installation, or gathered automatically (e.g., via Link Layer Discovery Protocol (LLDP), port linkup/link down detection, etc.). In an example implementation, the switch management table incorporates only information from physical switches; however, other example implementations can include virtual switch information if needed.

At 802, the topology collection feature 400b-3 creates a storage management table, by gathering storage information (e.g., storage pool configuration, port to reach to logical unit, etc) from each storage array 300, by using a protocol (e.g., storage management initiative specification (SMI-S), customized proprietary protocols, etc.).

At 803, the topology collection feature 400b-3 creates an address management table, by storing MAC address information of each host 100, IP address for each MAC address, and resource image information (e.g., hypervisor version, version and type of OS for bare-metal resource installation, etc.) for each host 100. Resource image will be a certain version of hypervisor, a certain version and sort of OS for bare-metal resource installation, and so on. At the initial process, it only has MAC address records which come from host management table. In an example implementation, the address management table incorporates information only from physical hosts; however, other example implementations can include virtual hosts if needed.

Figure 9:
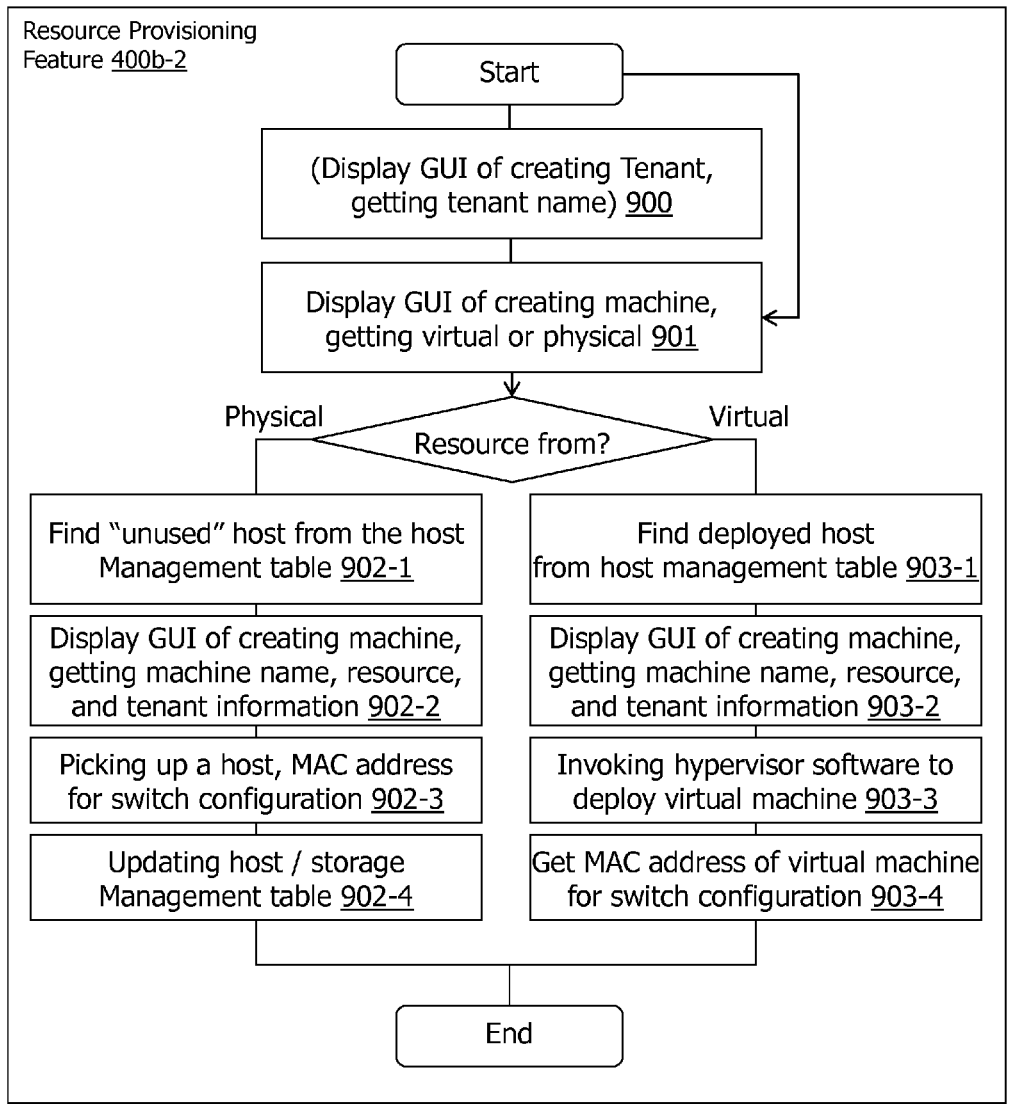
FIG. 9 illustrates a flowchart for creating a new tenant and/or a new resource, in accordance with an example embodiment.

FIG. 9 illustrates a flowchart for creating a new tenant and/or a new resource, in accordance with an example embodiment. FIGS. 10(a) to 10(f) illustrate graphical user interfaces (GUI), in accordance with an example embodiment. Elements of FIG. 9 will be described with references to FIG. 4, FIGS. 10(a) to 10(g), and FIG. 11 to FIG. 15.

Figure 10A:
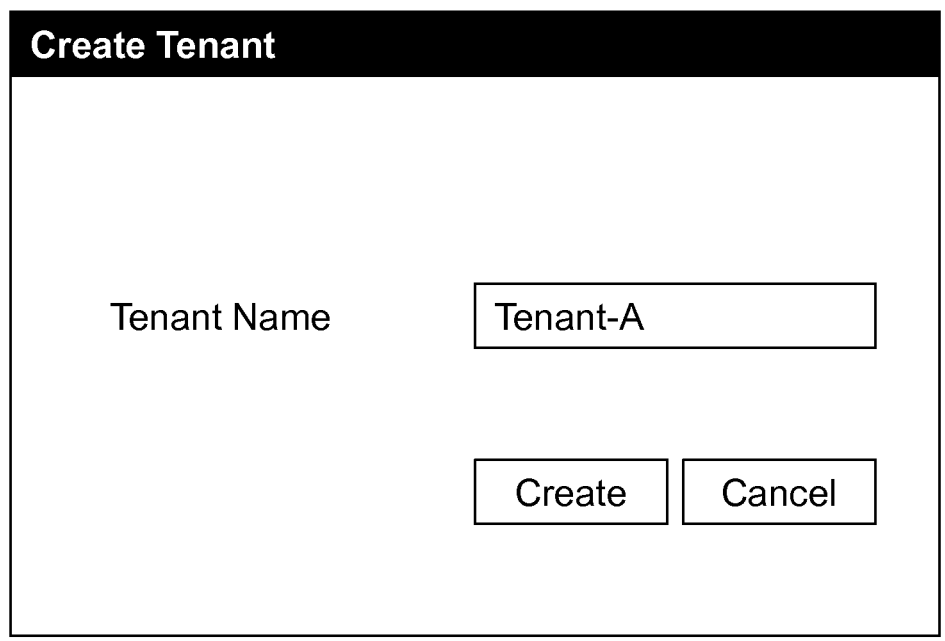
FIGS. 10(*a*) to 10(*f*) illustrate graphical user interfaces (GUI), in accordance with an example embodiment.

At 900, the tenant user can input the tenant name through GUI as shown in FIG. 10(a). The resource provisioning feature 400b-2 creates a tenant management table to manage the tenant name and tenant member. An example tenant management table can be found at FIG. 13, which can include entries for Tenant ID, VLAN ID associated with the tenant, and physical/virtual resources associated with each tenant. At this time, when resource provisioning feature 400b-2 creates the tenant management table, the resource provisioning feature 400b-2 also adds VLAN ID for the newly created tenant.

Figure 10B:
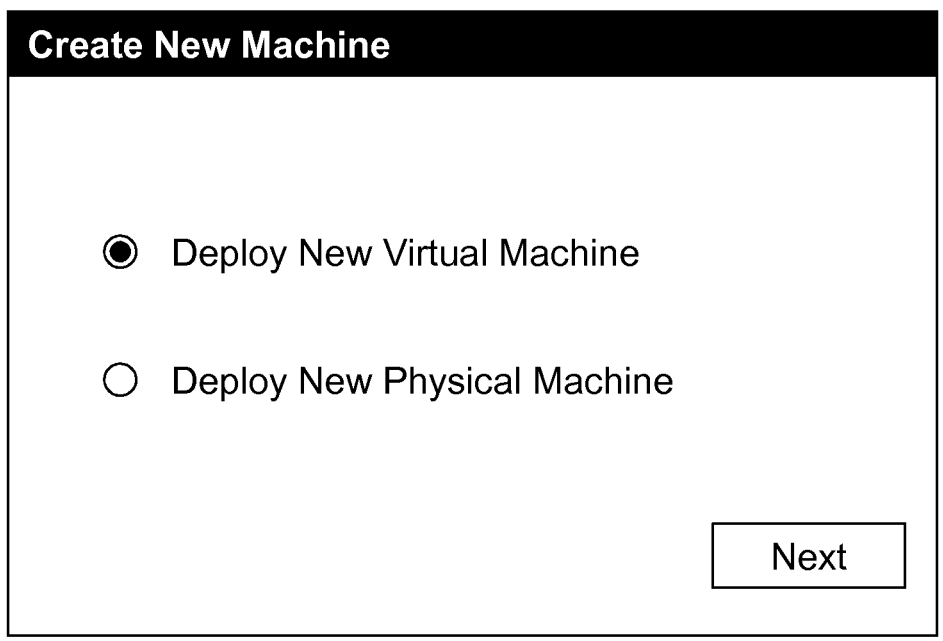

The resource provisioning feature 400b-2 can also create a new resource along with creating the new tenant. For example, at 901, the tenant user can use a graphical user interface (GUI) as shown in FIG. 10(b) to input required information for the provisioning. Resource provisioning feature 400b-2 collects required information through the GUI, and then configures resources such as the host 100, switch 200, hypervisor 100-2, and storage array 300.

As shown in FIG. 10(b), the tenant user chooses to deploy a physical or virtual computing resource. Resource provisioning feature 400b-2 will proceed depending on the deployment choice.

Deployment of Physical Resource

When a physical resource is deployed, the resource provisioning feature 400b-2 will proceed to 902-1. At 902-1, the resource provisioning feature 400b-2 will locate unused hosts as indicated by the host management table. At 902-2, a GUI will be provided as shown in FIG. 10(c) for inputting resource name for identifier, number of processors to use, memory size, and tenant to locate on. Information regarding number of processors and memory size may be obtained from the host management table as shown in FIG. 11. Based on the information from the host management table, the resource provisioning feature 400b-2 will locate unused hosts.

As shown in FIG. 11, the host management table manages all physical hosts 100 information on the cloud computing subsystem, and may include information such as host ID, number of CPUs, memory size, MAC address of the I/O device (e.g. network interface controller (NIC)), disks utilized, and status (e.g., reserved, deployed, unused, etc.). Status information represents how each host is deployed, (e.g., bare-metal server, hypervisor enabled host, etc.). In the GUI shown in FIG. 10(c), the tenant user can, for example, select hosts with the "unused" status for physical resource deployment. When tenant user selects these parameters, the host corresponding to the row on the management table can be reserved.

After the configuration is conducted through the GUI of FIG. 10(c), the tenant user may be directed to the GUI of FIG. 10(d) for inputting the virtual network configuration in the tenant. Each NIC on the resource can be connected to virtual network (e.g. data management zone (DMZ), private, etc.).

After the virtual network configuration, the tenant user may be directed to the GUI of FIG. 10(e) for inputting the storage configuration. The tenant user can attach storage resources from internal disks (if they exist), and/or external volumes (e.g., iSCSI, Network Attached Storage (NAS), Fibre Channel (FC), FC over Ethernet (FCoE), etc.). In an example interface, if the tenant user tries to deploy a physical resource, the checkbox for "virtual volume" may be omitted.

In the example of FIG. 10(e), MyPool1 can be used as a storage resource pool to curve out logical volume in storage array, managed by a storage management table as shown in FIG. 12. A storage management table may include entries with information for Storage ID, Pool, LUN and status. For example, MyPool1 can be a thin provisioned storage resource pool which includes one or more RAID groups. MyPool1 can also have multiple storage pools for providing multiple storage service level (tier). When the tenant user chooses the parameters for MyPool1, the storage ID and logical unit number corresponding to the row(s) on the storage management table can be reserved.

After getting/creating the storage management table information, the resource provisioning feature 400b-2 makes a host 100 available for the tenant user. The resource provisioning feature 400b-2 proceeds to 902-3 to configure a related switch 200 to let the host join the tenant by picking up the MAC address. To configure a related switch, the resource provisioning feature 400-12 adds the VLAN ID to the physical ports on switch 200 where the host connects, to permit received Ethernet frames with the VLAN ID from the host.

The flow proceeds to 902-4 to update the storage and host management tables. The updating of the tables identifies related resources of the host into "used". The management IP address of the host for the tenant user can then be shown.

Optionally, an interface can be provided to allow the tenant user to install OS through PXE, which allows for a net-boot execution of physical host. For example, adding a software image path for the PXE boot allows the host to boot up by using specified software image. In this example, the resource provisioning feature 400b-2 adds a software image path in the row of MAC address of the host, which may be sent to the PXE/DHCP server before executing the PXE boot. The system administrator of the cloud computing subsystem could use the PXE interface to deploy hypervisor software on the physical host to create a virtual resource environment for tenant user as needed.

When the tenant user deletes the deployment of the physical resource, the status of the host will turn into "unused" for next usage.

Deploying a Virtual Resource

If the tenant user selects to deploy a virtual resource, the resource provisioning feature proceeds to 903-1 to find a deployed host from the host management table (e.g., "ESXi" in the example of FIG. 11). If there are already deployed hosts running hypervisor, the resource provisioning feature can proceed to 903-2, wherein the tenant user will see the GUI of FIG. 10(c) for inputting a resource name as an identifier, a number of processors to use, memory size, and a tenant to locate the virtual resource. The tenant user can input the number of processors and the memory size as needed, as long as hosts running hypervisor on the cloud computing subsystem can provide such resources.

After the configuration is conducted through the GUI of FIG. 10(c), the tenant user may be directed to the GUI of FIG. 10(d) for inputting the virtual network configuration in the tenant. Each NIC on the resource can be connected to the virtual network (e.g., DMZ, private, etc.).

After the virtual network configuration, the tenant user may be directed to the GUI of FIG. 10(e) for inputting the storage configuration. The tenant user can attach storage resource from virtual disk, and/or external volume (e.g., iSCSI, NAS, FC, FCoE), for raw device mapping.

After the configuration of the virtual network, resource provisioning feature 400b-2 proceeds to 903-3 to invoke a hypervisor software to deploy the virtual resource on a hypervisor running host, and then to 904-4 to configure a related virtual switch to let the virtual resource join the tenant. To configure the related virtual switch, the resource provisioning feature 400b-2 adds VLAN ID to the virtual ports on virtual switch where the virtual resource connects, in order to allow Ethernet frames with the VLAN ID from the virtual resource. The resource provisioning feature 400-12 can further obtain a connection mapping table between the virtual resource and the virtual switch by accessing a hypervisor, and can add such mapping information into switch management table. When the switch management table is updated, the management IP address of the virtual host for the tenant user can then be shown.

Optionally, an interface can be provided to allow the tenant user to install OS on the virtual resource through PXE, which allows for a net-boot execution of physical host. For example, adding a software image path for the PXE boot allows the host to boot up by using specified software image. In this example, the resource provisioning feature 400-12 adds a software image path in the row of MAC address of the host, which may be sent to the PXE/DHCP server before executing the PXE boot.

When the tenant user deletes the deployment of the physical resource, the status of the host will turn into "unused" for next usage.

FIGS. 10(f) and 10(g) illustrate additional interfaces for selecting a virtual resource. From the selection of a virtual volume from FIG. 10(f), a datastore for specifying the logical volume to place the virtual resource is provided, as shown in FIG. 10(g). An interface may be provided so that the user can select a desired storage pool regardless of if the user selects a physical resource or a virtual resource. For example, when user chooses to create a physical resource, the system will create a new logical volume from the storage pool that the user selects. When the user selects a virtual resource, the system will create, for example, a virtual volume (VMDK) on a specific logical volume (datastore) coming from the storage pool that the user selects. In the example of FIG. 10(g), when the user selects a virtual resource, an interface is provided to allow the user to select which datastore to create the virtual resource.

Using OpenFlow to Create the Tenant

In the above mentioned examples, the cloud computing subsystem uses VLAN to create a network isolated tenant. There are several considerations for using VLAN ID. For example, the VLAN ID may be a limited resource, (e.g., up to 4096 bytes in size), and the cloud computing subsystem may not be capable of creating tenants beyond VLAN ID limitation. The backbone network could be pre-configured as "allow VLAN ID all" through multiple cloud computing subsystems, however, this configuration may not work because of the network security policy of the backbone network.

OpenFlow enables physical and virtual switches to execute a flow based network frame delivery. The flow will be defined by using source address, destination address, protocol, and so on. Below are examples for providing network isolated tenants through multiple cloud computing subsystems, in view of the considerations for using VLAN ID.

Address Resolution

To manage the tenant, cloud computing subsystem involves a network that can prevent access between computing resources located on different tenants. The network restricts the sending/receiving Ethernet/IP frames from differing tenants and also permits the transfer Ethernet/IP frames among computing resources within the same tenant.

The Ethernet/IP communication can involve resolving the MAC address. When a node tries to send an IP packet, the network utilizes the MAC address of the IP address. This address resolution mechanism is known as ARP (Address Resolution Protocol). The communication can also involve sending a unicast packet to the other node. The unicast packet may have information including an Ethernet header, an Ethernet payload including an IP header, and an IP payload.

FIG. 14 illustrates an example of an address management table, in accordance with an example embodiment. The address management table, may include information such as the MAC address of each host, the IP address that is allocated for each MAC address, and optionally, resource image information to be applied for the PXE boot. Without a VLAN ID, the broadcast frame will be delivered to all of the resources in the cloud computing system(s) and may get communicated to different tenants. To direct the broadcast frame to the pertinent tenant, the cloud computing subsystem forwards the broadcast frame into the OpenFlow controller of management node 400, whereupon OpenFlow controller checks the tenant management table to restrict broadcast frame propagation to the different tenants.

When a resource in the tenant tries to communicate other resources with IP addresses in the tenant, the resource obtains the MAC address of the IP address by using ARP. Normally, ARP proceeds by sending a broadcast to the same broadcast domain, with a query message (e.g., "who has this IP address A"), wherein a node having the IP address will reply back to the node with the message (e.g., "I (MAC address A) have the address").

Figure 15:
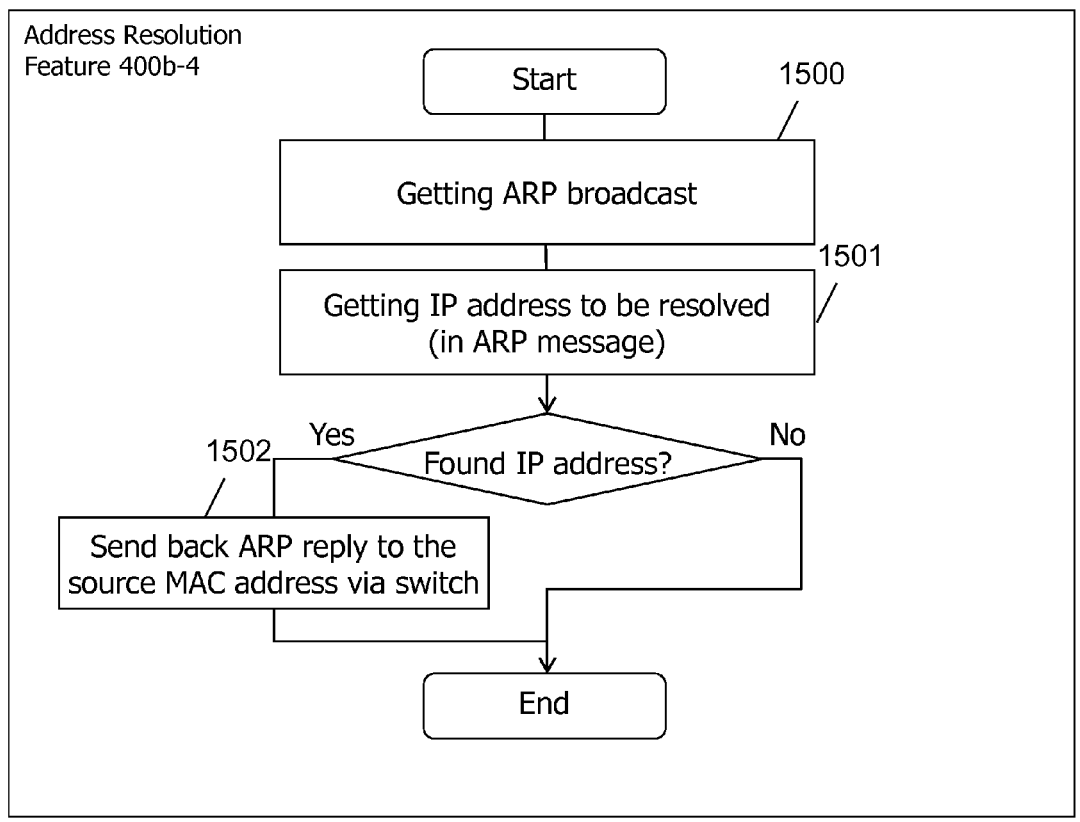
FIG. 15 illustrates a flow diagram for address resolution, in accordance with an example embodiment.

FIG. 15 illustrates a flow diagram for address resolution, in accordance with an example embodiment. As described above, this cloud computing subsystem may use a method other than using the broadcast ARP to provide multi tenant networks across multiple cloud computing system. At 1500, the address resolution feature 400b-4 obtains a host list. Once the virtual/physical switch receives broadcast frame of ARP (e.g., identified by Ether type of Ethernet header, indicating ETH_P_ARP (0x0806)) from a resource, the switch forwards this broadcast frame to OpenFlow controller in management node.

At 1501, the address resolution feature attempts to determine an IP address for the MAC address in the broadcast. The OpenFlow controller checks source MAC address to determine tenant, and ARP frame to identify the IP address to answer and proceeds to 1502 to send an ARP reply frame to the resource with the answer if an IP address is found. For example, when resource MX01 asks "who is IP address 10.1.1.2", for instance, OpenFlow controller can answer "MX02 has 10.1.1.2" with checking both tenant management table and address management table. The OpenFlow controller eliminates broadcast frame propagation across multiple cloud computing subsystems. If no IP address is found, then the address resolution feature can forward a message indicating that no IP address was found.

Figure 16:
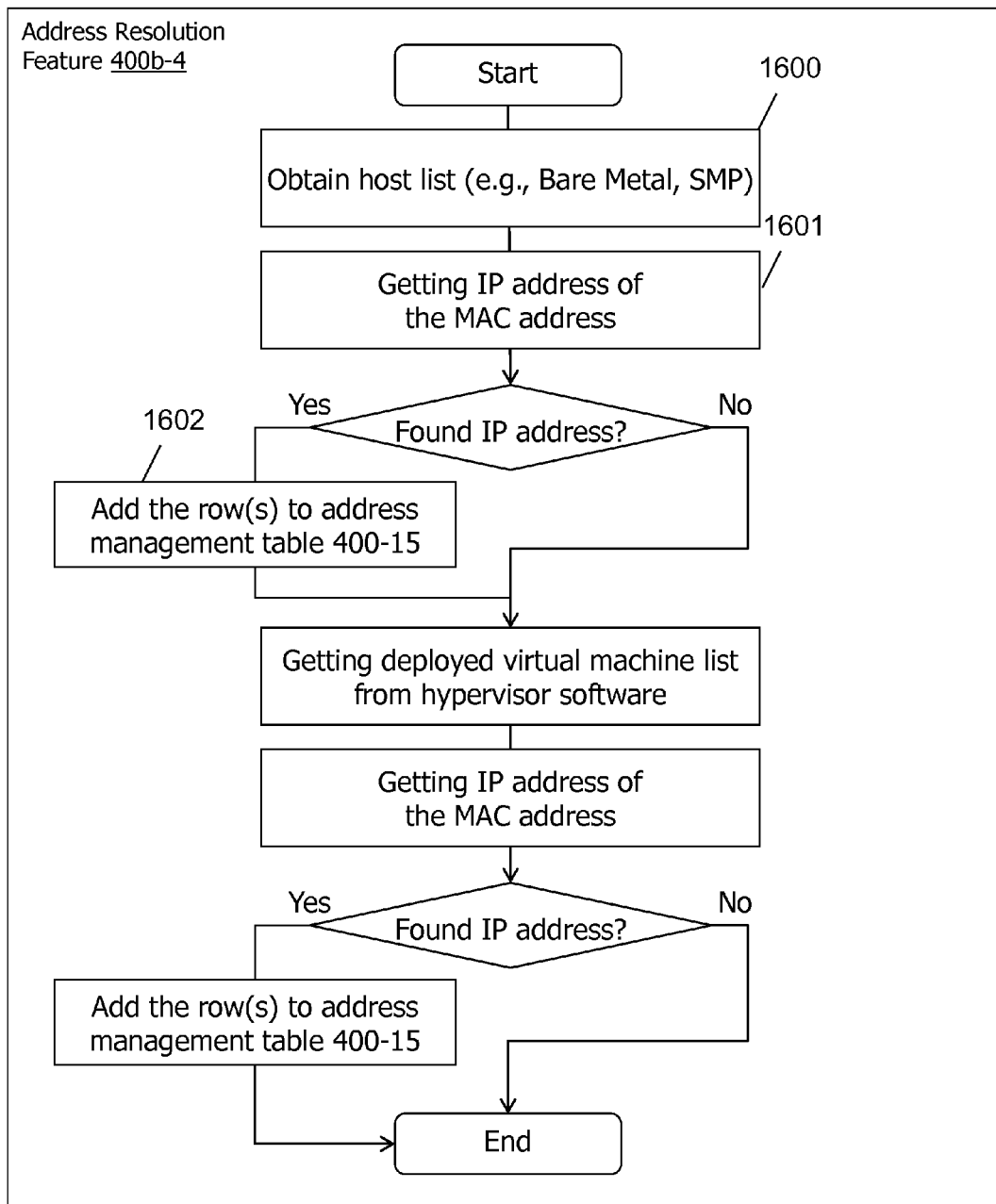
FIG. 16 illustrates a flowchart for address collection to create address management table, in accordance with an example embodiment.

FIG. 16 illustrates a flowchart for address collection to create address management table, in accordance with an example embodiment. Each record of address management table is created before the OpenFlow ARP procedure. At 1600, each management agent of physical resource and virtual resource sends their MAC address and IP address information when IP address is configured on the NIC. Address resolution feature 400b-4 gets the information and add or update address management table.

Flow Control of OpenFlow

In various example embodiments, a management computer can be configured to manage a plurality of tenants by managing flow information. The flow information can include flow tables such as OpenFlow tables. The management computer can utilize one or more central processing units (CPU) to manage a plurality of tenants, where one or more of the tenants may utilize either one or more virtual resources, one or more physical resources, or some combination thereof. By managing the flow table, the management computer can control the actions of the virtual and physical switches either indirectly (e.g., the virtual and physical switches refer to the flow information to determine a course of action for a frame coming from or to each of the tenants managed by the switches), or directly, by forwarding the flow table information and instructing the switches to act accordingly. The management computer can thereby utilize the flow information to define each of the plurality of tenants for use by the switches switch for controlling flow of a frame of each of the tenants.

The flow information utilized in an OpenFlow flow table can include address information (e.g., MAC address, IP address, etc.) for each of the virtual or physical resources, and as well as action information (e.g., indicating which port to forward a frame, actions to do on the header of the frame, etc.). Such flow information can also provide an association of the address information of each virtual/physical resource of each tenant to a physical switch controlling the access to each tenant, or to a virtual switch controlling the flow within a tenant and/or between tenants. In addition, the management computer may be further configured to process an address resolution protocol (ARP) broadcast by identifying an address to be resolved in the ARP broadcast, and forwarding a resolution for the address to be resolved to the one or more switches corresponding to a source address associated with the ARP broadcast. Further detail is provided below in the description of FIGS. 17 and 18(a) to 18(c).

FIG. 17 shows an example of a flow table for OpenFlow, in accordance with an example embodiment. OpenFlow frames may involve information for the switch port, the MAC source, the MAC destination, the Ethernet type, the VLAN ID, the IP source, the IP destination, the IP protocol, the transmission control protocol (TCP) source port, the TCP destination port and the action used. An OpenFlow enabled switch (virtual/physical) forwards frames defined as the flow table. The flow table will be applied by an OpenFlow controller on management node 400. When a resource is deployed and added to the tenant, the flow table will be updated by OpenFlow controller and applied to each switch (as described in FIG. 9). In the example of FIG. 17, with reference to FIG. 7, the ARP broadcast frame will be transferred to the OpenFlow controller, Ethernet frame transfer among the objects in tenant A 700-1 become permitted, Ethernet frame transfer among the objects in tenant B 700-2 become permitted, and other Ethernet frames are discarded.

In the example of FIG. 17, the Ethernet frame forwarding may be executed by a normal Ethernet frame forwarder 200d, after reviewing the flow of the OpenFlow flow table. Each switch 200 port that connects to the backbone network may be configured as MAC-MAC/IP tunneling to deliver Ethernet/IP frames across multiple cloud computing subsystems, if needed.

The example flow table of FIG. 17 forbids the sending of broadcast frames across resources within the same tenant, except by ARP. However, other configurations are also possible to enable the sending of broadcast frames within the same tenant.

FIG. 18(a) illustrates another example of an OpenFlow flow table, in accordance with an example embodiment. In the example of FIG. 18(a), a configuration example for switch PSwitch01 602-01 of FIG. 6 is provided. Once an Ethernet frame is received, PSwitch01 may proceed as follows based on the OpenFlow flow table of FIG. 18(a). If the frame is received from P24 (an uplink port connecting to the backbone network), PSwitch01 602-01 evaluates whether the frame comes from another cloud computing subsystem. In the example of FIG. 18(a), PSwitch01 602-01 regards all frames with the VLAN ID of the table as the cloud computing subsystem related frames. If the frame is an ARP broadcast, PSwitch01 602-01 may send the frame to the OpenFlow controller in management node 400. If the source MAC address is the MAC address of tenant A 700-1, the flow table group for "Tenant-A" (e.g., as shown in FIG. 18(b)) may be applied. If the source MAC address is the MAC address of tenant B, a flow table group for "Tenant-B" may be applied.

FIG. 18(b) shows an example of an OpenFlow flow table for PSwitch01 602-01, group "Tenant-A" 700-1, in accordance with an example embodiment. As described above, if a received frame contains a source MAC address corresponding to the MAC address of tenant A 700-1, the PSwitch01 602-01 may proceed as follows, based on the flow table of FIG. 18(b). If the destination MAC address is the broadcast address, the frame may be sent to every port that connects the physical resources of tenant-A 700-1, and virtual switches. If the destination MAC address is the broadcast address, the frame may be sent to uplink port (when uplink port is NOT the ingress port). Ethernet frames with a specific destination MAC address will be sent to the corresponding port on PSwitch01. In the example of FIG. 18(b), frames to MV01 and MV02 will be sent to P0 (VSwitch01 603-01), frames to MV03 will be sent to P1 (VSwitch02 603-02), frames to MP04 will be sent to P3 (physical host), and frames to LU02 will be sent to P3 (Storage array 300).

In the example of FIG. 18(b), if the destination MAC address is owned by the resources in same tenant but different cloud computing subsystem (e.g. subsystem B), the PSwitch01 602-01 will add Ethernet/IP header with the MAC/IP address of switch 200y of cloud computing subsystem and VLAN 100 for encapsulation and then send it to P24.

FIG. 18(c) illustrates the example of OpenFlow flow table of VSwitch01 603-01, group "Tenant-A" 700-1, in accordance with an example embodiment. Once an Ethernet frame is received, VSwitch01 will act as follows in accordance with the flow table of FIG. 18(c).

If the destination MAC address is the broadcast address, the frame will be sent to every port that connects to the virtual resources of tenant-A 700-1, and to the uplink port of PSwitch01 602-01 (P512) unless the broadcast from comes from uplink port. An Ethernet frame with a specific destination MAC address will be sent to corresponding ports on VSwitch01 603-01. In the example of FIG. 18(c), frames to MV01 will be sent to port P0, and frames to MV02 will be sent to port P1.

If the destination MAC address is owned by the resources from the same tenant but not connected to the virtual switch (VSwitch01 603-01), VSwitch01 603-01 sends the frame to the uplink port.

FIGS. 19(a) and 19(b) illustrate examples of switch management table, in accordance with an example embodiment. The switch management table is used to create OpenFlow flow table as shown in FIGS. 18(a) to 18(c), by providing information of physical and virtual resources associated with each switch, and the corresponding ports of each switch associated with each resource. Switch management table may be updated by the topology collection feature 400b-3 each time a physical/virtual resource us deployed/deleted/moved. In the example of FIGS. 19(a) and 19(b), the switch management table is separated by physical switch PSwitch01 602-01 and PSwitch02 602-02, along with their associated virtual switches for clarity, however, both of the tables can be incorporated into one switch management table.

When a physical resource is deployed, the topology collection feature 400b-3 may obtain a MAC address of the host, and then determine the physical port and physical switch 200 to be connected. The topology collection feature 400b-3 can determine the physical port and switch by various ways, such as LLDP (Link Layer Discovery Protocol), checking SNMP trap (linkup/down) with turning NIC on/off, and so on.

When a virtual resource is deployed, the topology collection feature 400b-3 gets the virtual NIC of the virtual resource, and the virtual port on the virtual switch connected to the virtual resource, through use such as hypervisor software.

When VMotion (virtual resource moving to another physical host) occurs, the topology collection feature 400b-3 re-scans virtual switch information to refresh the switch management table.

Moreover, other implementations of the embodiments will be apparent to those skilled in the art from consideration of the specification and practice of the embodiments disclosed herein. Various aspects and/or components of the described embodiments may be used singly or in any combination in the image identification system. It is intended that the specification and examples provided be considered as examples only, with a true scope and spirit of the embodiments being indicated by the following claims.

What is claimed is:

1. A computer system, comprising:
   a host computer distributed in separated sub-networks;
   a management computer managing a plurality of tenants based on tenant management information and address management information, the plurality of tenants configured to be isolated from each other by a backbone network; wherein at least one of the plurality of tenants comprises at least one of one or more virtual resources and one or more physical resources on the host computer, wherein the at least one of the one or more virtual resources and the one or more physical resources are identified by the address management information, the management computer creating flow information comprising tenant information relating to information of the at least one of the one or more virtual resources and the one or more physical resources identified by the address information and action information to identify a flow of a frame for each of the plurality of tenants; and one or more switches controlling an access of each of the plurality of tenants by using address information of the at least one of the one or more virtual resources and the one or more physical resources based on the flow information from the management computer, wherein the one or more switches are configured to forward frames having an address resolution protocol (ARP) broadcast to the management computer.

2. The computer system of claim 1, wherein the one or more switches comprises a virtual switch configured to control the flow of the frame for at least one of the plurality of tenants associated with the virtual switch by identifying destination address information of the frame and referring to the flow information to forward the frame to a virtual resource or a physical resource with the address information corresponding to the destination address information.

3. The computer system of claim 1, wherein the one or more switches comprises a physical switch configured to control access to each of the at least one of the plurality of tenants by identifying a source address information of the frame and referring to the flow information to identify a corresponding one of the plurality of tenants having a virtual resource or a physical resource with the address information corresponding to the source address information.

4. The computer system of claim 3, wherein the physical switch is configured to identify a destination address information of the frame and referring to the flow information of the corresponding one of the plurality of tenants to determine a corresponding virtual resource or a physical resource of the corresponding one of the plurality of tenants with the address information corresponding to the destination address information.

5. The computer system of claim 1, wherein the management computer is further configured to process the address resolution protocol (ARP) broadcast by identifying an address to be resolved in the ARP broadcast, and forwarding a resolution for the address to be resolved to the one or more switches corresponding to a source address associated with the ARP broadcast.

6. A management computer, comprising:
a central processing unit (CPU) that is configured to:
manage a plurality of tenants based on tenant management information and address management information, the plurality of tenants configured to be isolated from each other by a backbone network, wherein at least one of the plurality of tenants comprises at least one of one or more virtual resources and one or more physical resources on a host computer distributed in separated sub-networks,
wherein the at least one of the one or more virtual resources and the one or more physical resources are identified by the address management information, the management computer creating flow information comprising tenant information relating to information of the at least one of the one or more virtual resources and the one or more physical resources identified by the address information and action information to identify a flow of a frame for each of the plurality of tenants; and
manage the flow information for each of the plurality of tenants; the flow information associated with address information of the at least one of the one or more virtual resources and the one or more physical resources for use by one or more switches for controlling an access of each of the plurality of tenants, wherein the one or more switches are configured to forward frames having an address resolution protocol (ARP) broadcast to the management computer.

7. The management computer of claim 6, wherein the flow information comprises the address information of each of a virtual resource or a physical resource of at least one of the plurality of tenants associated with a virtual switch configured to control the flow of the frame, and comprises action information for the frame for each of the virtual resource or the physical resource of the at least one of the plurality of tenants associated with the virtual switch.

8. The management computer of claim 6, wherein the flow information comprises an association of the address information of each of a virtual resource or a physical resource with each tenant of the plurality of tenants associated with a physical switch configured to control the access.

9. The computer system of claim 8, wherein the flow information further comprises:
the address information of each of a virtual resource or a physical resource of at least one of the plurality of tenants associated with the physical switch; and
action information for the frame for each of the virtual resource or the physical resource of the at least one of the plurality of tenants associated with the virtual switch.

10. The management computer of claim 6, wherein the CPU is further configured to process the address resolution protocol (ARP) broadcast by identifying an address to be resolved in the ARP broadcast, and forwarding a resolution for the address to be resolved to the one or more switches corresponding to a source address associated with the ARP broadcast.

11. A non-transitory computer readable storage medium storing instructions for a management computer, the instructions comprising:
managing a plurality of tenants based on tenant management information and address management information, the plurality of tenants configured to be isolated from each other by a backbone network, wherein at least one of the plurality of tenants comprises at least one of one or more virtual resources and one or more physical resources on a host computer distributed in separated sub-networks, wherein the at least one of the one or more virtual resources and the one or more physical resources are identified by the address management information,
creating flow information comprising tenant information relating to information of the at least one of the one or more virtual resources and the one or more physical resources identified by the address information and action information to identify a flow of a frame for each of the plurality of tenants;
managing the flow information for each of the plurality of tenants; the flow information associated with address information of the at least one of the one or more virtual resources and the one or more physical resources for use by one or more switches for controlling an access of each of the plurality of tenants, wherein the one or more switches are configured to forward frames having an address resolution protocol (ARP) broadcast to the management computer.

12. The non-transitory computer readable storage medium of claim 11, wherein the flow information comprises the address information of each of a virtual resource or a physical resource of at least one of the plurality of tenants associated with a virtual switch configured to control the flow of the frame, and comprises action information for the frame for each of the virtual resource or the physical resource of the at least one of the plurality of tenants associated with the virtual switch.

13. The non-transitory computer readable storage medium of claim 11, wherein the flow information comprises an association of the address information of each of a virtual resource or a physical resource with each tenant of the plurality of tenants associated with a physical switch configured to control the access.

14. The non-transitory computer readable storage medium of claim 13, wherein the flow information further comprises:
the address information of each of a virtual resource or a physical resource of at least one of the plurality of tenants associated with the physical switch; and
action information for the frame for each of the virtual resource or the physical resource of the at least one of the plurality of tenants associated with the virtual switch.

15. The non-transitory computer readable storage medium of claim 11, wherein the instructions further comprise:
identifying an address to be resolved in the address resolution protocol (ARP) broadcast, and forwarding a resolution for the address to be resolved to the one or more switches corresponding to a source address associated with the ARP broadcast.

16. The computer system of claim 5, wherein the action information comprises port information indicative of a destination port for the frame.

17. The computer system of claim 16, wherein the action information comprises one or more actions directed to a header of the frame.

18. The computer system of claim 5, wherein the management computer is configured to create the flow information by referring to switch management information comprising topology information regarding one or more physical switches and one or more virtual switches within the one or more switches, wherein the management computer is configured to update the switch management information by conducting topology collection for a configuration change to the one or more switches.

* * * * *